US009508311B2

(12) United States Patent
Lee et al.

(10) Patent No.: US 9,508,311 B2
(45) Date of Patent: Nov. 29, 2016

(54) DISPLAY APPARATUS, CONNECTABLE EXTERNAL PERIPHERAL DEVICE AND METHOD OF DISPLAYING AN IMAGE

(71) Applicant: SAMSUNG ELECTRONICS CO., LTD., Suwon-si (KR)

(72) Inventors: Tae-young Lee, Suwon-si (KR); Soon-jae Cho, Anyang-si (KR); Cheul-hee Hahm, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 675 days.

(21) Appl. No.: 13/711,839

(22) Filed: Dec. 12, 2012

(65) Prior Publication Data

US 2013/0169874 A1 Jul. 4, 2013

(30) Foreign Application Priority Data

Dec. 28, 2011 (KR) .................. 10-2011-0144921
Dec. 29, 2011 (KR) .................. 10-2011-0146321
May 23, 2012 (KR) .................. 10-2012-0054906

(51) Int. Cl.
| | |
|---|---|
| *H04N 5/64* | (2006.01) |
| *G09G 5/00* | (2006.01) |
| *G06F 3/14* | (2006.01) |
| *H04N 21/418* | (2011.01) |
| *H04N 21/442* | (2011.01) |
| *H04N 21/81* | (2011.01) |

(52) U.S. Cl.
CPC .............. *G09G 5/006* (2013.01); *G06F 3/14* (2013.01); *H04N 5/64* (2013.01); *H04N 21/4183* (2013.01); *H04N 21/44231* (2013.01); *H04N 21/8193* (2013.01); *G09G 2340/10* (2013.01); *G09G 2340/125* (2013.01); *G09G 2360/06* (2013.01); *G09G 2360/08* (2013.01); *G09G 2360/10* (2013.01); *G09G 2370/027* (2013.01); *G09G 2370/12* (2013.01)

(58) Field of Classification Search
None
See application file for complete search history.

(56) References Cited

U.S. PATENT DOCUMENTS

| | | | | | |
|---|---|---|---|---|---|
| 2001/0036203 | A1* | 11/2001 | Yamaguchi | ...... | H04N 21/43615 370/535 |
| 2006/0233520 | A1* | 10/2006 | Jung | .............................. | 386/95 |

(Continued)

OTHER PUBLICATIONS

Communication, dated Apr. 22, 2013, issued by the European Patent Office in counterpart European Application No. 12194902.8.

(Continued)

*Primary Examiner* — Eileen Adams
(74) *Attorney, Agent, or Firm* — Sughrue Mion, PLLC

(57) ABSTRACT

A display apparatus, a connectable external peripheral device and a method of displaying an image are disclosed. The display apparatus includes a display unit; an image processor which first processes an image signal according to a preset first image processing operation, and secondly processes the first processed image signal processed according to the first image processing operation, and outputs the processed image signal to the display unit. The display apparatus further includes a peripheral device connector, to which an external peripheral device is connected that processes the image signal processed by the first image processing operation. The second image processing operation is performed in the external peripheral device. The image processor transmitting to the external peripheral device the first processed image signal in response to the external peripheral device being connected to the peripheral device connector.

20 Claims, 9 Drawing Sheets

(56) References Cited

U.S. PATENT DOCUMENTS

2007/0097269 A1\* 5/2007 Tsukamoto .......... H04N 5/4403
  348/705
2009/0244378 A1\* 10/2009 Chen ........................ H04N 5/45
  348/565

OTHER PUBLICATIONS

Anonymous: "Turn Your TV into a Smart TV", Dec. 7, 2010, p. 1, XP054975134, Retreived from the Internet on Apr. 11, 2013: URL: http://www.youtube.com/watch?v=fdQd7Cxsp1U; 1 page total.

\* cited by examiner

DISPLAY APPARATUS, CONNECTABLE EXTERNAL PERIPHERAL DEVICE AND METHOD OF DISPLAYING AN IMAGE

CROSS-REFERENCE TO RELATED APPLICATION

This application claims priorities from Korean Patent Applications No. 10-2011-0144921, filed on Dec. 28, 2011, No. 10-2011-0146321, filed on Dec. 29, 2011, and No. 10-2012-0054906, filed on May 23, 2012 in the Korean Intellectual Property Office, the disclosures of which are incorporated herein by reference.

BACKGROUND

1. Field

Methods and apparatuses consistent with the exemplary embodiments relate to a display apparatus having a connectable external peripheral device and a method of displaying an image. More particularly, the exemplary embodiments relate to a display apparatus, a connectable external peripheral device and a method of displaying an image for providing improved or enhanced functions that were not previously recommended for the display apparatus. The display device is connectable to an external peripheral device that provides a function which may not have been previously supported by the display apparatus or which improves an existing operation of the display apparatus.

2. Description of the Related Art

A display apparatus processes an image signal or image data which are supplied by external various image supply sources or are stored in the display apparatus, and displays an image on a display panel based on the processed image signal/image data. For example, a display apparatus which is provided to general users may include a TV or a monitor.

Such a display apparatus has been upgraded in hardware to operate at a fast speed and provides added new functions in software. However, the display apparatus is an expensive electronic device and it sometimes takes at least 5 years for a user to purchase a new display apparatus. Thus, a user cannot use an upgraded function during such period because it is not easy to replace some of parts of the display apparatus, from the perspectives of both manufacturing and usage, in the case of a hardware upgrade. Regarding a software upgrade, hardware designed to drive improved software is needed.

SUMMARY

The foregoing and/or other aspects of the inventive concept may be achieved by providing a display apparatus including a display unit; an image processor which first processes an image signal according to a preset first image processing operation, and secondly processes the first processed image signal in order to display an image on the display unit, and outputs the secondly processed image signal to the display unit; a peripheral device connector configured to be connected to an external peripheral device having an image processor which is configured to processes, according to a second image processing operation, the image signal processed by the image processor according to the first processing operation; and the image processor of the display apparatus transmitting to the external peripheral device the first processed image signal processed according to the first image processing operation in response to the external peripheral device being connected to the peripheral device connector, and the image processor in the external peripheral device processing the image signal processed according to the second image processing operation and outputting to the display unit the secondly-processed image signal.

The image processor of the display apparatus further includes a first image processor which processes the image signal according to the first image processing operation, and a second image processor which secondly processes the image signal transmitted by the first image processor or the image signal transmitted by the external peripheral device which is processed according to the second processing operation, and outputs the image signal processed by the second image processor to the display unit, wherein the first image processor selectively transmits the image signal to either the external peripheral device or to the second image processor depending on whether a connection exists between the external peripheral device and the peripheral device connector.

The second image processing operation includes a synthesizing operation for overlapping a preset graphic signal onto the image signal transmitted by the first image processor.

The display apparatus further comprising a user input, wherein the graphic signal comprises image information which corresponds to an input from a user to the user input.

The image signal which is transmitted and received between the display apparatus and the external peripheral device through the peripheral device connector is transmitted and received in frames.

The display apparatus further includes a broadcast signal receiver which receives a signal broadcast from the outside, and an image signal receiver which receives an image signal from an external image source device, wherein the first image processing operation comprises a multiplexing operation for synthesizing the broadcasting signal received by the broadcast signal receiver and the image signal received by the image signal receiver, into a picture-in-picture (PIP) image.

The display apparatus further includes a storage device which stores therein first UI image data generated by the image processor, wherein the image processor processes second UI image data to display the processed UI image data on the display unit in response to the data generated by the external peripheral device converting the first UI image data by being stored in the storage device.

The second UI image data are generated by synthesizing the first UI image data generated by the external peripheral device and the third UI image data generated by the image processor.

The display apparatus further includes an image receiver which receives an image signal from the outside, wherein the image processor of the display apparatus synthesizes the received image signal and the second UI image data, and outputs the synthesized image data to the display unit.

The display apparatus further includes a user input, wherein the image processor of the display apparatus generates the first UI image data based on one of an input from a user received through the user input and a user's input transmitted by the external peripheral device.

An external peripheral device which is configured for connection to a display apparatus includes a display apparatus connector which configured for connection to the display apparatus; the display apparatus configured to process an image signal according to a preset first image processing operation, and secondly processes the first processed image signal to display an image based on the secondly processed image signal; and an image processor within the external peripheral device which processes the first processed image signal according to a second image processing operation, wherein the image signal processed according to the second processing operation is transmitted from the display apparatus through the display apparatus connector, and transmits to the display apparatus the image signal processed according to the second image processing operation so that the image signal processed according to the second image processing operation is processed according to a third image processing operation by image processor of the display apparatus.

The second image processing operation includes a synthesizing operation for overlapping a preset graphic signal to the image signal transmitted by the display apparatus.

The graphic signal includes image information which corresponds to the input of a user to a user input of the display apparatus.

The image signal which is configured to be transmitted and received between the display apparatus and the external peripheral device through the peripheral device connector is transmitted and received in frames.

The image processor of the external peripheral device generates second UI image data by converting first UI image data stored in a storage unit of the display apparatus, and stores the second UI image data in the storage unit.

The second UI image data is generated by synthesizing the first UI image data and third UI image data generated by the image processor.

A method of controlling a display apparatus includes first processing an image signal according to a preset first image processing operation; and secondly processing the first processed image signal processed according to a first processing operation in order to display an image; the first processed image signal processed according to a first processing operation comprises transmitting the first processed image signal processed according to a first image processing operation to an external peripheral device in response to the external peripheral device processing the image signal according to a second image processing operation being connected to the display apparatus; and receiving from the external peripheral device the image signal processed according to the second image processing operation from the external peripheral device to secondly process the image signal that has been processed according to the a third image processing operation.

A method of controlling an external peripheral device which is configured to be connected to a display apparatus includes connecting to the display apparatus which first processes an image signal according to a preset first image processing operation and secondly processes the first processed image signal in order to display an image based on the first processed image signal which is processed according to the first image processing operation; transmitting the image signal processed according to a first processing operation to the external peripheral device for processing according to a second image processing operation; and transmitting to the display apparatus the image signal processed according to the second image processing operation so that the image signal processed according to the second image processing operation is secondly processed by the display apparatus according to a third image processing operation.

The inventive concept further includes a display apparatus and external peripheral device comprising a display unit within the display apparatus; an image processor within the display apparatus; the image processor processes an image signal according to a preset first image processing operation; a peripheral device connector connected to the external peripheral device having an image processor which processes, according to a second image processing operation, the image signal processed by the image processor according to the first processing operation, and the external peripheral device transmitting to the display apparatus the image signal processed according to the second image processing operation where the image processor processes the received image signal according to a third image processing operation.

The display apparatus and external peripheral device further includes a display apparatus connector within the external peripheral device.

BRIEF DESCRIPTION OF THE DRAWINGS

The above and/or other aspects of the inventive concept will become apparent and more readily appreciated from the following description of the exemplary embodiments, taken in conjunction with the accompanying drawings, in which.

DETAILED DESCRIPTION OF EXEMPLARY EMBODIMENTS

Figure 1:
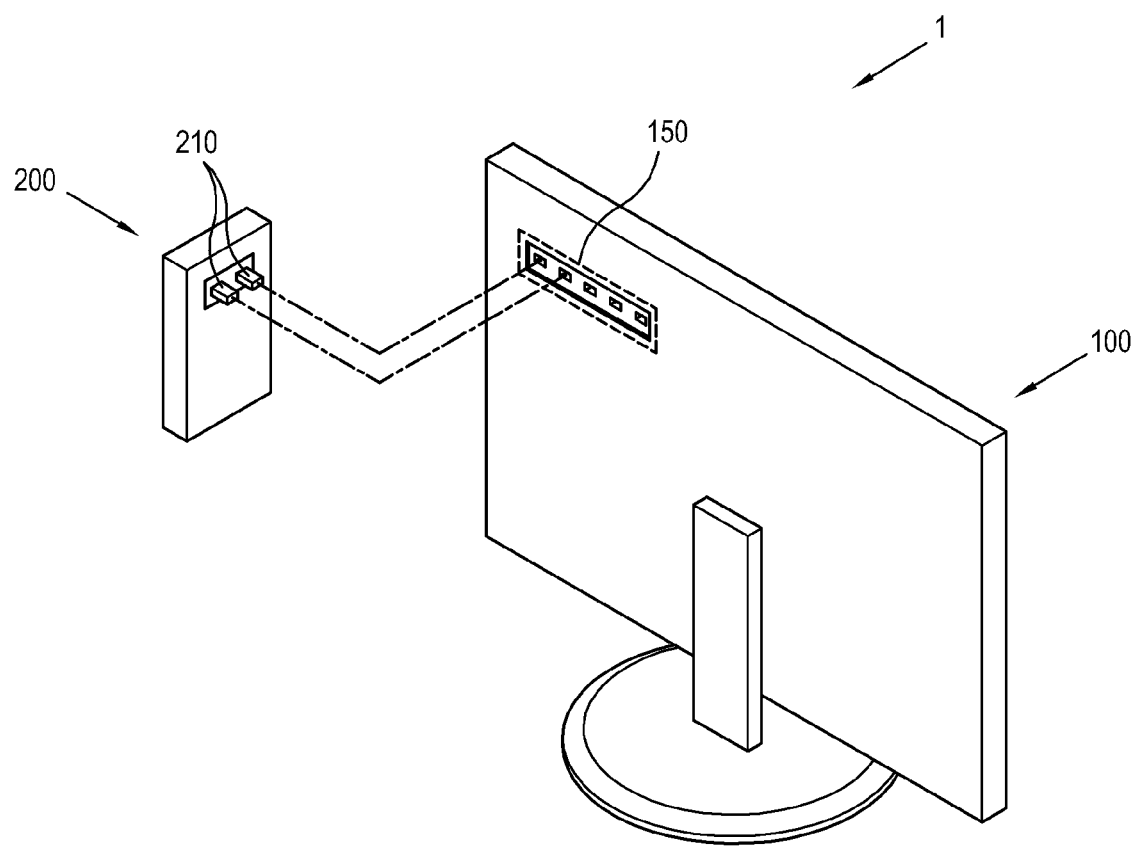
FIG. 1 illustrates a display system according to a first exemplary embodiment of the present inventive concept.

Below, exemplary embodiments will be described in detail with reference to accompanying drawings so as to be easily understood by a person having ordinary knowledge in the art. The exemplary embodiments may be embodied in various forms without being limited to the exemplary embodiments set forth herein. Descriptions of well-known parts are omitted for clarity, and like reference numerals refer to like elements throughout.

FIG. 1 illustrates a display system 1 according to an exemplary embodiment of the present inventive concept. As shown therein, the display system 1 according to the present exemplary embodiment includes a display apparatus 100 and an external peripheral device 200 which is connectable to the display apparatus 100. The external peripheral device 200 may provide a function which is not supported by the display apparatus 100 or which improves an existing function or operation of the display apparatus 100.

The display apparatus 100 may be implemented as a TV which displays a broadcast image based on broadcast signals, broadcast information or broadcast data which are transmitted by a broadcast station. However, the spirit of the present inventive concept is not limited to the embodiment of the display apparatus 100, and in addition to a TV, the display apparatus 100 may be implemented as other various devices which may display an image. The type of an image which is displayable by the display apparatus 100 is not limited to the broadcast image, and may include a video, still image, applications, on screen display (OSD), a graphic user interface (GUI) to control various operations, based on signals/data transmitted by external various image sources, etc.

The external peripheral device 200 is connected to the display apparatus 100 for communication therewith. The external peripheral device 200 may provide a function which is not supported by the display apparatus 100 or may supplement functions or operations of the display. For example, the external peripheral device 200 may generate a graphic signal which may not be generated by the display apparatus 100, synthesize the graphic signal and an image transmitted by the display apparatus 100 and transmit the synthesized signal to the display apparatus 100. The external peripheral device 200 may provide a function which improves an existing operation of the display apparatus 100. For example, the external peripheral device 200 may include upgraded elements compared to hardware/software of the display apparatus 100, and may process an image signal with the upgraded elements and transmit an image with improved quality to the display apparatus 100.

The external peripheral device 200 may be connected to the display apparatus 100 in a wired or wireless manner. The external peripheral device 200 according to the present exemplary embodiment is connected to the display apparatus 100 in a wired manner in order to transmit and receive data/information/signals/power to/from the display apparatus 100, but is not limited thereto. The external peripheral device 200 and the display apparatus 100 include their own connectors and terminals 150 and 210 for physical/electric interconnection.

Alternatively, the external peripheral device 200 may be connected to the display apparatus 100 in a wireless manner unlike in the present exemplary embodiment. In this case, the external peripheral device 200 may receive power from an additional external power source or battery. In the present exemplary embodiment, however, the case where the external peripheral device 200 is connected to the display apparatus 100 in a wired manner will be explained.

The display apparatus 100 may process an image signal, which is transmitted from the outside, according to a preset image processing operation and display an image based on the processed image signal. According to the present exemplary embodiment, in response to the external peripheral device 200 being connected to the display apparatus 100, the external peripheral device 200 receives an image signal that has been at least partly processed by the display apparatus 100, performs an image processing operation that is not supported by the display apparatus 100, or an upgraded image processing operation to the image signal compared to the image processing operation of the display apparatus 100, and transmits the processed image signal to the display apparatus 100.

Figure 2:
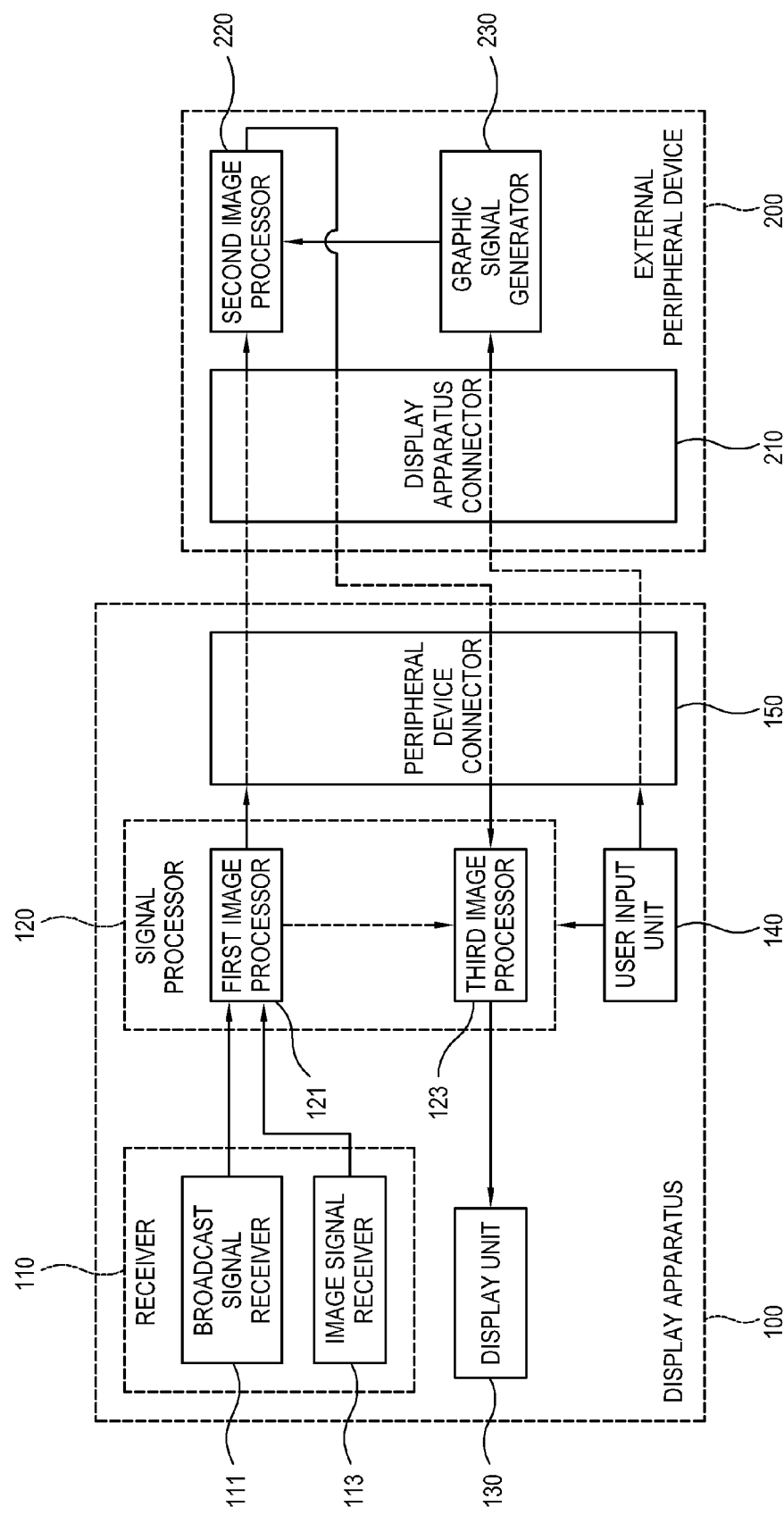
FIG. 2 is a block diagram of the display system in FIG. 1.

Hereinafter, elements of the display apparatus 100 and the external peripheral device 200 will be described with reference to FIG. 2. FIG. 2 is a block diagram of the display apparatus 100 and the external peripheral device 200 according to the exemplary embodiment forming the display system 1.

As shown therein, the display apparatus 100 includes a receiver 110, a signal processor 120, a display unit 130, a user input unit 140, and a peripheral device connector 150.

The external peripheral device 200 includes a display apparatus connector 210, a second image processor 220 and a graphic signal generator 230.

The receiver 110 transmits to the signal processor 120 an image signal transmitted by an external image source (not shown). The receiver 110 may include a broadcast signal receiver 111 which receives a broadcast signal from a transmission device (not shown) of a broadcast station. For example, the broadcast signal receiver 111 may include an antenna (not shown) and/or a tuner (not shown). The receiver 110 may include an image signal receiver 113 which receives an image signal from an external image source (not shown). The image signal receiver 113 varies depending on a standard of a received image signal or embodiments of an image source (not shown) and the display apparatus 100. For example, the image signal receiver 113 may receive signals/data according to standards such as high definition multimedia interface (HDMI), universal serial bus (USB) and component, and may include a plurality of connection terminals (not shown) which correspond to the aforementioned standards.

The signal processor 120 processes an image signal transmitted by the receiver 110, and transmits the processed image signal to the display unit 130 or to the peripheral device connector 150.

The signal processor 120 includes a first image processor 121 and a third image processor 123. The first image processor 121 performs a first image processing operation with respect to an image signal transmitted by the receiver 110, and the first image processing operation may include an extracting operation in response to the image signal transmitted by the receiver 110 including an image signal compressed as a digital signal. The first image processing operation may include other various image processing operations such as a de-multiplexing operation for dividing an image signal, a decoding operation which corresponds to an image format of an image signal, a de-interlacing operation which converts an interlace image signal into a progressive image signal, a scaling operation which adjusts an image signal to a preset resolution, a detail enhancement operation, a frame refresh rate conversion operation, etc.

The first image processing operation may further include a de-multiplexing operation to synthesize two image signals transmitted through the receiver 110 into a picture in picture (PIP) image. For example, the first image processing operation may include a multiplexing operation which synthesizes a broadcast signal transmitted to the broadcast signal receiver 111 and an external image signal transmitted to the image signal receiver 113 into a PIP image.

The third image processor 123 may perform a third image processing operation on the image signal to which the first image processing operation has been performed by the first image processor 121 or the image signal to which the second image processing operation has been performed and transmitted by the external peripheral device 200 through the peripheral device connector 150. For example, in response to the external peripheral device 200 being connected to the peripheral device connector 150, the third image processor 123 may perform the third image processing operation to the second processed image signal and transmitted by the external peripheral device 200 through the peripheral device connector 150. In response to the external peripheral device 200 not being connected to the peripheral device connector 150, the third image processor 123 may perform the third image processing operation to the first processed image signal performed by the first image processor 121.

The third image processing operation may include a format converting operation which converts an image format which corresponds to a display panel which will be later described. The third image processing operation may include a format converting operation which is performed after the performance of the de-multiplexing operation in response to an image signal having been multiplexed before the performance of the third image processing operation.

The signal processor 120 may further include an audio signal processor (not shown) which processes an audio signal separate from the image processing operation. In this case, the display apparatus 100 may further include a speaker (not shown) to output a voice which corresponds to an audio signal processed by the audio signal processor.

The signal processor 120 may be implemented as an image processing board (not shown) which is formed by mounting various chipsets (not shown), memories (not shown), electronic parts (not shown), wiring (not shown), etc. on a printed circuit board (PCB) (not shown) in order to perform the first and third image processing operations.

The display unit 130 may display an image thereon which corresponds to an image signal to which the third image processing operation has been performed and which image signal is output by the signal processor 120. The display unit 130 may include a display panel (not shown) and a panel driver (not shown) which drives the display panel. The display unit 130 may be implemented as various display panels including liquid crystal, plasma, light-emitting diode (LED), organic light-emitting diode (OLED), surface-conduction electron-emitter, carbon nano-tube, and nano-crystal, but is not limited thereto.

The user input unit 140 may transmit to the signal processor 120 various preset control commands or unlimited information according to a user's manipulation and input to the user input unit. The user input unit 140 includes a menu key and an input panel installed in an external part of the display apparatus 100 or in a remote controller which is separated/spaced from the display apparatus 100. The user input unit 140 may be integrally formed in the display unit 130. That is, in response to the display unit 130 including a touch screen, a user may transmit a preset command to the signal processor 120 through an input menu (not shown) displayed on the display unit 130.

The user input unit 140 may transmit through the peripheral device connector 150 to the external peripheral device 200 an input according to a user's selection.

The peripheral device connector 150 may be implemented as an interface to which the external peripheral device 200 is connectable. According to an exemplary embodiment of the present inventive concept, the peripheral device connector 150 may include a first port (not shown) to which the display apparatus 100 transmits an image signal, a second port (not shown) through which the external peripheral device 200 transmits an image signal to the display apparatus 100, and a third port (not shown) through which a control signal may be transmitted and received between the display apparatus 100 and the external peripheral device 200. The first and second ports (not shown) may include a digital interface which may transmit a digital signal including one of HDMI and DVI, and the third port may include a digital interface to transmit and receive a digital control signal such as HDMI, consumer electronics control (CEC) or a USB interface to transmit and receive data and power.

The first processed image signal performed by the first image processor 121 is transmitted to the external peripheral device 200 through the first port, and the secondly-processed image signal is transmitted from the external peripheral device 200 to the display apparatus 100 through the second port.

According to another exemplary embodiment, the image signal may be input from the external peripheral device 200 to the display apparatus 100 through the first port, not the second port.

In response to the display apparatus 100 and the external peripheral device 200 transmitting and receiving an image signal through the peripheral device connector 150, the image signal may be transmitted and received in frames. For example, the display apparatus 100 transmits the image signal in frames to the external peripheral device 200 through the peripheral device connector 150, and the external peripheral device 200 transmits in frames to the display apparatus 100 the second processed image signal. In response to the image signal being transmitted and received in frames, transmission delay is shortened and video synchronization is performed without difficulty.

According to another exemplary embodiment, all of the signals transmitted by the display apparatus 100 to the external peripheral device 200 may be encoded for security of the contents of the transmitted signals. Prior to processing, the encoded signal may be decoded by the external peripheral device 200.

With the foregoing configuration, as usage time elapses, the display apparatus 100 may be upgraded due to various factors including development of technology. For example, the display apparatus 100 may be upgraded to receive an image signal in a new format which was not recommended when the display apparatus 100 was manufactured, or may receive an image signal with a resolution which is higher than the level supported by the display apparatus 100 in order to meet a trend requiring a high quality image, or may reduce the system load to the display apparatus 100.

Upgrading the display apparatus 100 may be considered based upon the aspects of hardware and software. According to the present exemplary embodiment, the external peripheral device 200 may be connected to the peripheral device connector 150 and may upgrade at least one of existing hardware and software of the display apparatus 100.

The external peripheral device 200 may include hardware/software which corresponds to at least a part of hardware/software resources of the display apparatus 100. The hardware/software of the external peripheral device 200 may perform an improved function than at least a part of the resources of the display apparatus 100. In this case, upon connection to the display apparatus 100, the external peripheral device 200 replaces at least a part of the existing resources of the display apparatus 100 to thereby improve a quality of an image displayed by the display apparatus 100. Alternatively, the external peripheral device 200 may perform a new function that is not supported by the display apparatus 100. Then, the external peripheral device 200 may generate a graphic signal that is not generated by the display apparatus 100, may multiplex the graphic signal to the image signal transmitted by the display apparatus 100 and may transmit the image signal to the display apparatus 100.

Hereinafter, elements of the external peripheral device 200 will be explained.

As shown in FIG. 2, the external peripheral device 200 includes a display apparatus connector 210, a second image processor 220 and a graphic signal generator 230.

The display apparatus connector 210 is connected to the peripheral device connector 150 in order to enable communication between the external peripheral device 200 and the display apparatus 100. The display apparatus connector 210 meets standards which correspond to the peripheral device connector 150. The display apparatus connector 210 is to be connected to the peripheral device connector 150, and may be connected to at least one of a plurality of ports (not shown) of the peripheral device connector 150. For example, the display apparatus connector 210 may be connected to the first port including HDMI and DVI interfaces in order to transmit and receive an image signal between the display apparatus 100 and the external peripheral device 200, and to the third port to transmit and receive data, control signals and/or power. This is merely an example of an exemplary embodiment, and the display apparatus connector 210 is not limited to the foregoing case, and may vary, as may the peripheral device connector 150.

Accordingly, in response to the external peripheral device 200 being connected to the display apparatus 100 through the display apparatus connector 210, the display apparatus 100 transmits, to the external peripheral device 200, the first processed image signal performed by the first image processor 121 of the signal processor 120.

in response to the display apparatus 100 and the external peripheral device 200 transmitting and receiving an image signal through the display apparatus connector 210, the image signal may be transmitted and received in frames. For example, the external peripheral device 200 receives an image signal in frames from the display apparatus 100 through the display apparatus connector 210, and transmits the secondly-processed image signal in frames to the display apparatus 100. In response to the image signal being transmitted and received in frames, transmission delay is shortened and video synchronization is performed without difficulty.

The second image processor 220 performs the second image processing operation with respect to an image signal.

The second image processing operation may include a fifth image processing operation which corresponds to a fourth image processing operation as at least a part of the first image processing operation performed by first image processor 121 of display apparatus 100. The fifth image processing operation includes an upgraded image processing operation compared to the fourth image processing operation. The fourth and fifth image processing operations have been named for distinction purpose only, and may be a single operation or a plurality of operations. The fifth image processing operation is an improved operation in functionality compared to the fourth image processing operation and this may be realized by improvement of hardware such as chipsets or improvement of software such as algorithms/execution codes/programs. The second image processor 220 may further perform the fifth image processing operation to the first processed first image signal which corresponds to the fourth image processing operation as at least a part of the first image processing operation, to thereby improve the image processing function. For example, the second image processor 220 improves a quality of an image signal to generate a second image signal which has an improved quality compared to the first image signal.

The second image processing operation may include a synthesizing operation which overlaps a predetermined graphic signal to an image signal. The graphic signal may include an image which corresponds to a user's selection that is input through the user input unit 140. The second image processing operation may include a multiplexing operation for overlapping the graphic signal generated by the graphic signal generator 230, to an image signal.

For example, in response to an input which corresponds to a "menu" button being performed through the user input unit 140, such input is transmitted to the external peripheral device 200 through the display apparatus connector 210, and the graphic signal generator 230 generates and transmits to the second image processor 220 an image which corresponds to the input (e.g., a GUI image corresponding to the menu). The second image processor 220 synthesizes the generated graphic signal and the image signal and transmits the synthesized image signal to the display apparatus 100 connected to the display apparatus connector 210. The graphic signal may include a GUI image which is an upgraded image compared to a GUI image that may be provided by the display apparatus 100, or a new GUI image or an image which was not designed to be generated by software provided at the time when the display apparatus 100 was manufactured.

The second image processing operation may include a performance of the second image processing operation after the de-multiplexing operation is performed in response to the image signal having been multiplexed before the performance of the second image processing operation.

In response to an input according to a user's selection being transmitted by the display apparatus 100 through the display apparatus connector 210, the graphic signal generator 230 generates and transmits to the second image processor 220 a graphic signal which corresponds to the input according to the user's selection. As described above, the graphic signal may include an upgraded image compared to an image which corresponds to an input according to a user's selection which may be provided by the display apparatus 100 (e.g. a GUI image), or a new image or GUI image that was not generated by software that was provided at the time of manufacturing the display apparatus 100.

According to another exemplary embodiment, in response a signal which is transmitted by the display apparatus 100 being encoded for security of the contents of the transmitted signal, the external peripheral device 200 may decode the encoded signal prior to performance of the second image processing operation.

Figure 3:
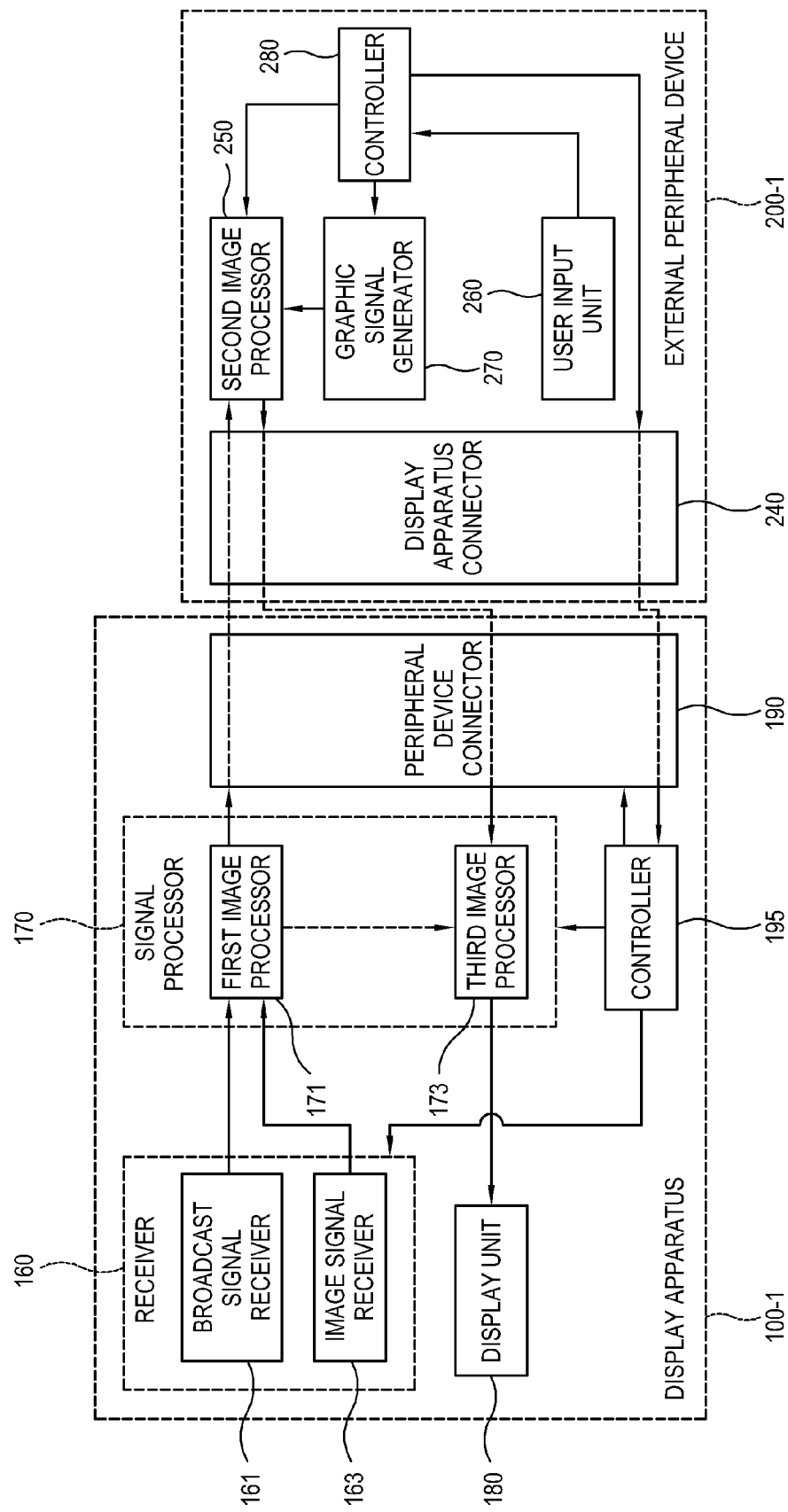
FIG. 3 is a block diagram of a display system according to another exemplary embodiment of the present inventive concept.

FIG. 3 is a block diagram of a display system according to another exemplary embodiment of the present inventive concept. A display apparatus 100-1 further includes a controller 195, and an external peripheral device 200 further includes a user input unit 260 and a controller 280. Other functions of elements are equal to/similar to the functions of corresponding elements in FIG. 2. Thus, repetitive explanation will be omitted.

The controller 195 may control overall operations of elements of the display apparatus 100-1, i.e., a receiver 160, a signal processor 170, a display unit 180 and a peripheral device connector 190, and may control transmission and reception of an image signal. The controller 195 may be implemented as a central processing unit (CPU).

The user input unit 260 of the external peripheral device 200 may transmit preset various control commands or may transmit unlimited information to the controller 280 as a result of a user's manipulation and input of the user input unit. The user input unit 260 includes a menu key and an input panel installed in an external part of the external peripheral device 200 or a remote controller which is separated/spaced from the external peripheral device 200. The user input unit 140 may be integrally formed in the display unit 130, and may include a touch screen or a touch panel to receive a user's input touch, but is not limited thereto.

The controller 280 of the external peripheral device 200 may control overall operations of the elements of the external peripheral device 200, i.e., the display apparatus connector 240, the second image processor 250, the user input unit 260 the graphic signal generator 270, and may control transmission and reception of an image signal.

Upon receiving from the user input unit 260 an input according to a user's selection, the controller 280 may transmit the input to the controller 195 of the display apparatus 100-1. Display apparatus 100-1 is connected to the display apparatus connector 240 so that the display apparatus 100-1 performs an operation which corresponds to such input.

Figure 4:
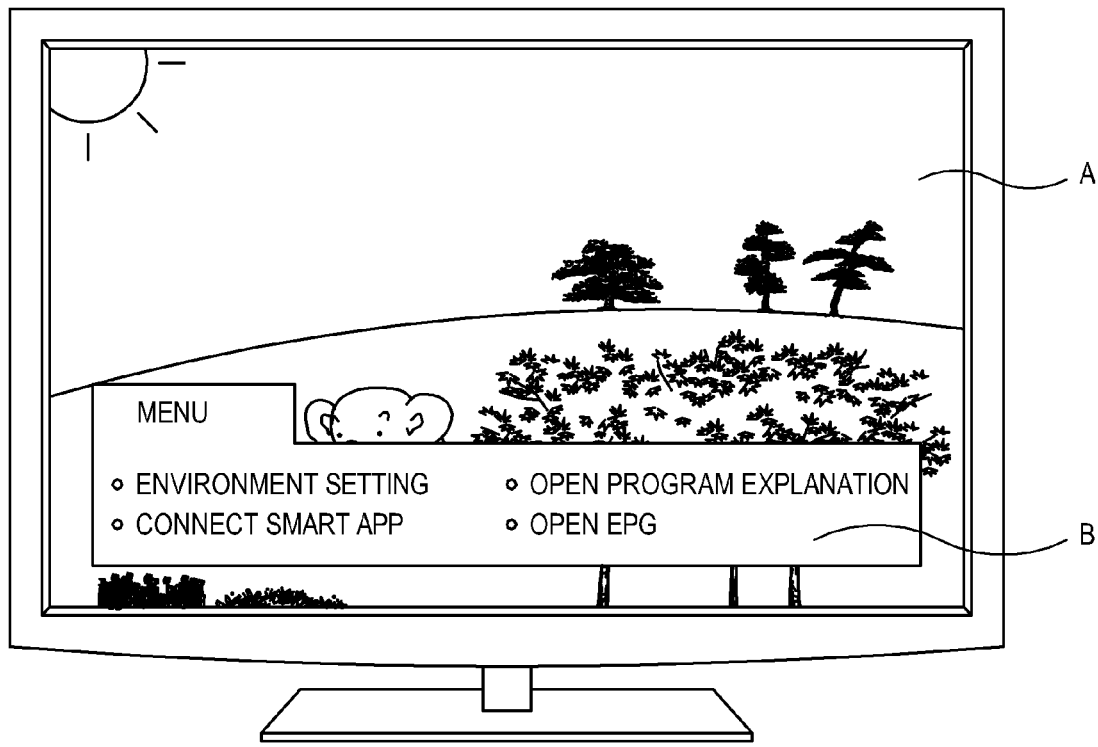
FIG. 4 illustrates an example of an image displayed in a display apparatus in FIG. 1.

FIG. 4 illustrates an example of a display apparatus which displays a processed image according to an exemplary embodiment of the present inventive concept, and shows a graphic signal generated by the external peripheral device 200 which overlaps an image signal, and the image signal displayed on the display apparatus 100.

As shown therein, the display unit 130 displays thereon an image A which corresponds to an image signal, and an image B which corresponds to a graphic signal. The image A of the image signal may be displayed based on a broadcast signal, or an image signal supplied by an external image source. The display apparatus 100 performing the first image processing operation on the received image signal A and transmits to the external peripheral device 200 an image signal which is generated by performing the first image processing operation to the received image signal A.

In response to an input which corresponds to the user's selection being transmitted to the display apparatus 100 or the external peripheral device 200, a graphic signal which corresponds to the input according to the user's selection is generated by the graphic signal generators 230 and 270.

For example, the graphic signal may include a GUI image which may be generated by the display apparatus 100 or an upgraded GUI image compared to a GUI image that may be generated by the display apparatus 100. in response to an input which corresponds to "menu" being transmitted through the user input units 140 and 260, the graphic signal generators 230 and 270 generate a GUI image B which represents the "menu" which corresponds to the user input.

The external peripheral device 200 generates a second image signal by multiplexing the generated graphic signal to the image signal transmitted by the display apparatus 100, and transmits the second image signal to the display apparatus 100. The display apparatus 100 displays on the display unit 130 the third image signal which is generated by performing the third image processing operation to the second image signal. Then, the image A of the image signal and the image B of the graphic signal may be displayed on the display unit 130.

Figure 5:
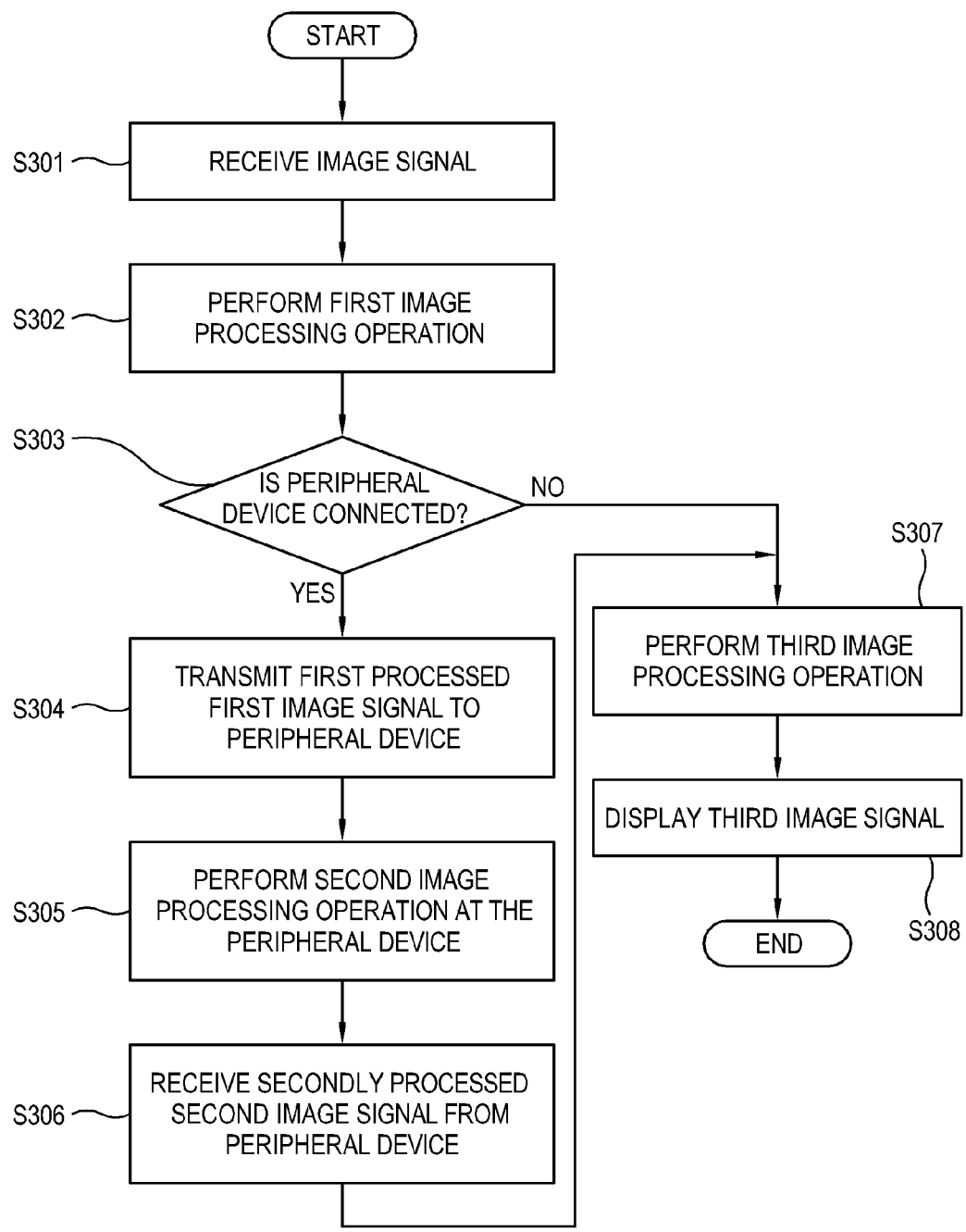
FIG. 5 is a flowchart of a method of displaying a an image on the display system in FIG. 1.

FIG. 5 is a flowchart of an image displaying method of the display system according to the exemplary embodiment of the present inventive concept.

As shown therein, the display apparatus 100 receives an image signal through the receiver 110 (S301). The image signal may include a broadcast signal from a broadcast station or an image signal from an external image source.

The first image processor 121 performs the first image processing operation with respect to the received image signal (S302).

Connection of the external peripheral device 200 to the peripheral device connector 150 of the display apparatus 100 is identified (S303).

In response to the external peripheral device 200 being connected to the display apparatus 100, the display apparatus 100 transmits the image signal processed by the first image processor to the external peripheral device 200 (S304).

The second image processor 220 of the external peripheral device 200 performs the second image processing operation to the image signal transmitted by the display apparatus 100 (S305), and transmits the image signal processed by the second image processor to the display apparatus 100 (S306).

The third image processor 123 of the display apparatus 100 performs the third image processing operation to the image signal transmitted by the external peripheral device 200 (S307), and the image signal processed by the third image processor is displayed on the display unit 130 (S308).

In response to a determination that the external peripheral device 200 is not connected to the peripheral device connector 150 at operation S303, the first image processor 121 of the display apparatus 100 transmits the first image signal to the third image processor 123, and the third image processor 123 performs the third image processing operation to the first image signal to generate a third image signal (S307).

In response to the external peripheral device 200 being connected to the display apparatus 100, the signal processor 120 according to the present exemplary embodiment transmits to the external peripheral device 200 the image signal processed by the first image processor. In response to the image signal being processed by the second image processor of the external peripheral device 200, the signal processor 120 of the display apparatus 100 receives the processed image signal from the external peripheral device 200 and performs the third image processing operation to display an image based on the image signal processed by the third image processor.

Figure 6:
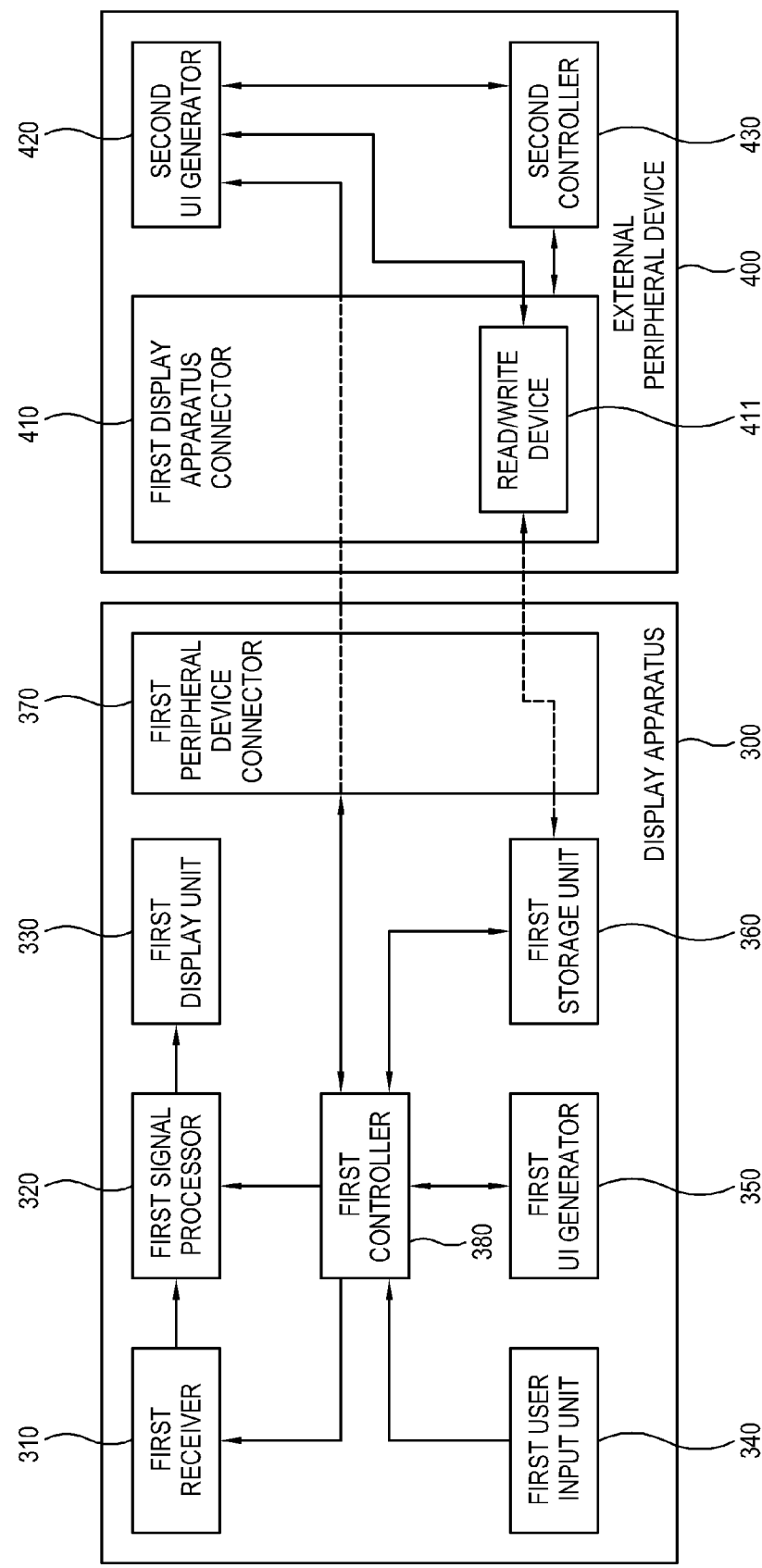
FIG. 6 is a block diagram of a display system according to a second exemplary embodiment of the present inventive concept.

Hereinafter, elements of a display apparatus 300 and an external peripheral device 400 according to a second exemplary embodiment of the present inventive concept will be described. FIG. 6 is a block diagram of the display apparatus 300 and the external peripheral device 400 according to the exemplary embodiment forming the display system 1.

As shown therein, the display apparatus 300 includes a first receiver 310, a first signal processor 320, a first display unit 330, a first user input unit 340, a first UI generator 350, a first storage unit 360, a first peripheral device connector 370, and a first controller 380 which controls the foregoing elements. The external peripheral device 400 includes a first display apparatus connector 410, a second UI generator 420 and a second controller 430 which controls the foregoing elements.

The first receiver 310 transmits to the first signal processor 320 an image signal transmitted by an external image source (not shown), and may receive a broadcast signal from a transmission device (not shown) of a broadcast station. For example, the first receiver 310 may include an antenna (not shown) and/or a tuner (not shown) which receives and/or tunes the broadcast signal. The first receiver 310 may receive an image signal from an external image source (not shown), and varies according to standards of the received image signal or embodiments of the image source and the display apparatus 300. For example, the first receiver 310 may receive signals/data according to standards such as HDMI, USB and component, and may include a plurality of connection terminals (not shown) which correspond to the foregoing standards.

The first signal processor 320 may perform a preset image processing operation with respect to an image signal transmitted by the first receiver 310 and may transmit the processed image signal to the first display unit 330. For example, the first signal processor 320 may perform at least one of various image processing operations including a de-multiplexing operation which divides an image signal, a decoding operation which corresponds to an image format of an image signal, a de-interlacing operation which converts an interlace image signal into a progressive image signal, a scaling operation which adjusts an image signal into a preset resolution, a detail enhancement operation, a frame refresh rate conversion operation, etc.

The first signal processor 320 may synthesize a first UI image generated by the first UI generator 350 (which will be described later) and an image signal output from the first receiver 310, as a result of a control operation of the first controller 380. This is performed when the external peripheral device 400 is not connected to the first peripheral device connector 370 (which will be described later). The synthesized image signal may be converted into an image format which corresponds to a display panel (not shown) of the first display unit 330 (which will be described later) which is to be output to the first display unit 330.

The first signal processor 320 may synthesize a second UI image which is generated by converting the first UI image, which is generated by the first UI generator 350, by the external peripheral device 400, and an image signal output by the first receiver 310, as a result of a control operation of the first controller 380. This is performed when the external peripheral device 400 is connected to the first peripheral device connector 370 (which will be described later). The synthesized image signal may be converted into an image format which corresponds to a display panel (not shown) of the first display unit 330 (which will be described later) to be output to the first display unit 330.

The first signal processor 320 may further include an audio signal processor (not shown) to process an audio signal different from the image processing operation. In this case, the display apparatus 300 may further include a speaker (not shown) to output a voice which corresponds to an audio signal processed by the audio signal processor.

The first signal processor 320 may be implemented as an image processing board (not shown) which is formed by mounting various chipsets (not shown), memories (not shown), electronic parts (not shown), wiring (not shown), etc. on a printed circuit board (PCB) (not shown).

The first display unit 330 may display an image which corresponds to an image signal output by the signal processor 320. The first display unit 330 may include a display panel (not shown) and a panel driver (not shown) which drives the display panel.

The first user input unit 340 may transmit various preset control commands or unlimited information to the controller 280 as a result of a user's manipulation and input of the first user input unit. The first user input unit 340 includes a menu key and an input panel installed in an external part of the display apparatus 300 or a remote controller which is separated/spaced from the display apparatus 300. The first user input unit 340 may be integrally formed in the first display unit 330. That is, in response to the first display unit 330 including a touch screen, a user may transmit a preset command to the first controller 380 through an input menu (not shown) displayed on the first display unit 330.

The first UI generator 350 generates and transmits the first UI image through a control operation of the first controller 380 to the first storage unit 360. The first UI image includes a UI image that is generated which corresponds to an input selection by a first user's input to input unit 140. For example, in response to a first user's selection which corresponds to a "menu" being input through the first user input unit 140, the first UI image is a UI image which corresponds to the "menu."

According to the present exemplary embodiment, the first signal processor 320 and the first UI generator 350 are separate elements, but the spirit of the present inventive concept is not limited thereto. For example, the first signal processor 320 and the first UI generator 350 may be formed as a single body, and the first signal processor 320 may also perform the operation of the first UI generator 350.

The first storage unit 360 stores therein the first UI image generated by the first UI generator 350 through a control operation of the first controller 380. The first storage unit 360 may include a non-volatile memory such as a flash memory or a hard disc drive. The first storage unit 360 is accessed by the first controller 380, and data stored therein may be read/recorded/modified/deleted/updated by the first controller 380. In response to the external peripheral device 400 being connected, the data stored in the first storage unit 360 may be read/recorded/modified/deleted/updated by a read/write means 411 of the external peripheral device 400.

The first peripheral device connector 370 includes an interface to which the external peripheral device 400 is connectable. The first peripheral device connector 370 may include a first port (not shown) which corresponds to the read/write means 411 of the display apparatus connector 410 (which will be described later). In response to the external peripheral device 400 being connected to the display apparatus 300 through the first peripheral device connector 370, the read/write means 411 may access the data stored in the first storage unit 360 and read/record/revise/delete/update the data. According to another exemplary embodiment of the present inventive concept, the first peripheral device connector 370 may include a second port (not shown) to transmit and receive an image signal between the display apparatus 300 and the external peripheral device 400. The first peripheral device connector 370 may further include a third port (not shown) to transmit and receive a control signal between the display apparatus 300 and the external peripheral device 400. The second port may include a digital interface to transmit and receive a digital signal such as one of HDMI and DVI, and the third port may include a digital interface to transmit and receive a digital control signal such as HDMI, CEC or a USB interface to transmit and receive data and power.

The first controller 380 controls various elements of the display apparatus 300. For example, the first controller 380 may control the first signal processor 320 to perform an image processing operation. The first controller 380 may control the first peripheral device connector 370 to transmit and receive signals/information/data, and may perform a control operation which corresponds to a command from the first user input unit 340 to thereby control overall operations of the display apparatus 300.

According to another exemplary embodiment, all of the signals transmitted from the display apparatus 300 to the external peripheral device 400 may be encoded for the security of the transmitted contents. The encoded signal may be decoded by the external peripheral device 400 prior to processing.

With the foregoing configuration, the display apparatus 300 may be upgraded due to various factors including development of technology as usage time elapses. For example, the display apparatus 300 may be upgraded to receive an image signal in a new format which was not recommended when the display apparatus 300 was manufactured, or receive an image signal with a resolution which is higher than the level supported by the display apparatus 300 in order to meet a trend requiring a high quality image, or reduce the system load to the display apparatus 300.

Upgrading the display apparatus 300 may be considered based upon the aspects of hardware and software. According to the present exemplary embodiment, the external peripheral device 400 may be connected to the first peripheral device connector 370 and may upgrade at least one of the existing hardware and software of the display apparatus 300.

The external peripheral device 400 may include hardware/software which corresponds to at least a part of hardware/software resources of the display apparatus 300. The hardware/software of the external peripheral device 400 may perform an improved function or operation than at least a part of the resources of the display apparatus 300. In this case, upon connection to the display apparatus 300, the external peripheral device 400 may replace at least a part of the existing resources of the display apparatus 300 to thereby improve a quality of an image displayed by the display apparatus 300. Then, the external peripheral device 400 may generate a UI image that may not be generated by the display apparatus 300, may synthesize the UI image and an UI image transmitted by the display apparatus 300 and may transmit the synthesized image to the display apparatus 300, or may modify the UI image transmitted by the display apparatus 300 and transmit the modified UI image to the display apparatus 300.

Hereinafter, elements of the external peripheral device 400 will be described.

The external peripheral device 400 includes a first display apparatus connector 410, a second UI generator 420 and a second controller 430 which controls the foregoing elements.

The first display apparatus connector 410 is connected to the first peripheral device connector 370 in order to enable communication between the external peripheral device 400 and the display apparatus 300. The first display apparatus connector 410 may have standards which correspond to the first peripheral device connector 370 to be connected to the first peripheral device connector 370, and may be connected to at least one of a plurality of ports (not shown) of the first peripheral device connector 370.

The first display apparatus connector 410 may include a read/write device 411, which accesses the first storage unit 360 of the display apparatus 300 and reads/records/modifies/deletes/updates stored data by a control of the second controller 430. The read/write device 411 may be connected to the first port which corresponds to the first peripheral device connector 370. The read/write device 411 may be connected to a second port (not shown) including HDMI and DVI interfaces to transmit and receive an image signal between the display apparatus 300 and the external peripheral device 400. The read/write device may be connected to a third port (not shown) to transmit and receive data, control signals and/or power. This is an example, and the read/write means 411 is not limited to the foregoing case, and may vary.

In response to the external peripheral device 400 being connected to the display apparatus 300 through the first display apparatus connector 410, the read/write device 411 may access the first storage unit 360 of the display apparatus 300 and read the first UI image stored therein by a control of the second controller 430. The read/write device 411 may access and record in the first storage unit 360 of the display apparatus 300 the second UI image that is generated, through conversion of the first UI image by the external peripheral device 400.

The second UI generator 420 may generate the second UI image by converting the first UI image stored in the first storage unit 360 of the display apparatus 300 read by the read/write device 411 of the first display apparatus connector 410 through a control operation of the second controller 430.

Conversion of the first UI image includes generating the second UI image by modifying at least a part of the first UI image. For example, as the second UI generator 420 may generate items, quality, colors, etc. which may not be provided by the first UI generator 350 of the display apparatus 300, the second UI generator 420 may generate the second UI image by converting at least one of the item, quality and color of the first UI image.

Alternatively, conversion of the first UI image may include generation of the second UI image by synthesizing a third UI image, which is newly generated by the second UI generator 420, and the first UI image. For example, the second UI generator 420 may generate as a third UI image a menu item, which may not be generated by the first UI generator 350 of the display apparatus 300, and may synthesize the third UI image and the first UI image to generate the second UI image.

The second controller 430 controls various operations of the external peripheral device 400. For example, the second controller 430 controls the first display apparatus connector 410 in order to transmit and receive signals/information/data, and controls the second UI generator 420 to generate the second UI image to thereby control overall operations of the external peripheral device 400.

According to another exemplary embodiment, in response to a signal which is transmitted by the display apparatus 300 being encoded for security of contents of the transmitted signal, the external peripheral device 400 may decode the encoded signal.

Figure 7:
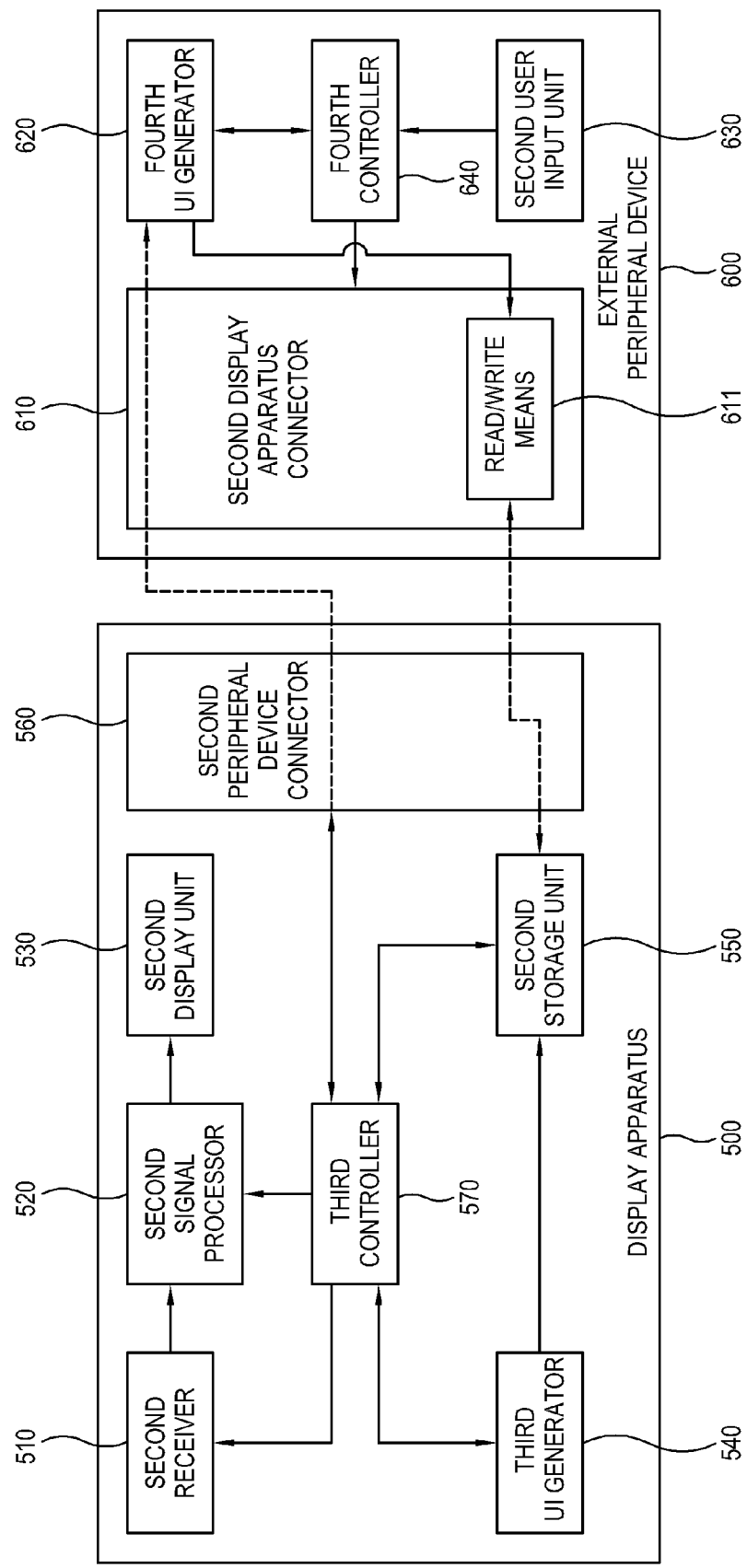
FIG. 7 is a block diagram of a display system according to another exemplary embodiment of the present inventive concept.

FIG. 7 is a block diagram of a display system according to another exemplary embodiment of the present inventive concept. The display system in FIG. 7 is different from the display system in FIG. 2 in that FIG. 7 further includes a user input unit 630 through which a user's input is input through external peripheral device 600. Other functions of elements are equal to/similar to the functions of corresponding elements in FIG. 6. Thus, repetitive explanation will be omitted. That is, functions performed (i) by the second receiver 510 of a display apparatus 500 are equal to/similar to those of the first receiver 310; (ii) by the second signal processor 520 are equal to/similar to those of the first signal processor 320; (iii) the second display unit 530 are equal to/similar to those of the first display unit 330; (iv) the third UI generator 540 are equal to/similar to those of the first UI generator 350; (v) the second storage unit 550 are equal to/similar to those of the first storage unit 360; (vi) the second peripheral device connector 560 are equal to/similar to those of the first peripheral device connector 370, and (vii) the third controller 570 are equal to/similar to those of the first controller 380. Thus, repetitive description will be omitted. The second display apparatus connector 610 of the external peripheral device 600 performs functions which are equal to/similar to those of the first display apparatus connector 410, and the fourth UI generator 620 performs functions which are equal to/similar to those of the second UI generator 420. Thus, repetitive description will be omitted.

The second user input unit 630 of the external peripheral device 600 may transmit various preset control commands or unlimited information to the fourth controller 640 through a user's manipulation and input to input unit 630. The second user input unit 630 includes a menu key and an input panel installed in an external part of the external peripheral device 600 or a remote controller which is separated/spaced from the external peripheral device 600. The second user input unit 630 may include a touch screen or a touch panel to receive a touch of a user's input.

The fourth controller 640 may control overall operations of elements of the external peripheral device 600.

In response to a second user's selection being input through the second user input unit 630, the fourth controller 640 may transmit the second user's selection to the display apparatus 500 through the second display apparatus connector 610. In response to the display apparatus 500 receiving the second user's selection from the external peripheral device 600, the fourth controller 640 may control the third UI generator 540 in order to generate a first UI image which corresponds to the second user's selection and store the first UI image in the second storage unit 550.

The fourth controller 640 may control a read/write means 611 of the second display apparatus connector 610 to access the second storage unit 550 and read the first UI image, and control the fourth UI generator 620 to generate the second UI image by converting the first UI image. The fourth controller 640 may control the read/write device 611 to record the generated second UI image in the second storage unit 550. The conversion of the first UI image is the same a or similar to the description as explained in the prior exemplary embodiment and description thereof will be omitted.

Figure 8:
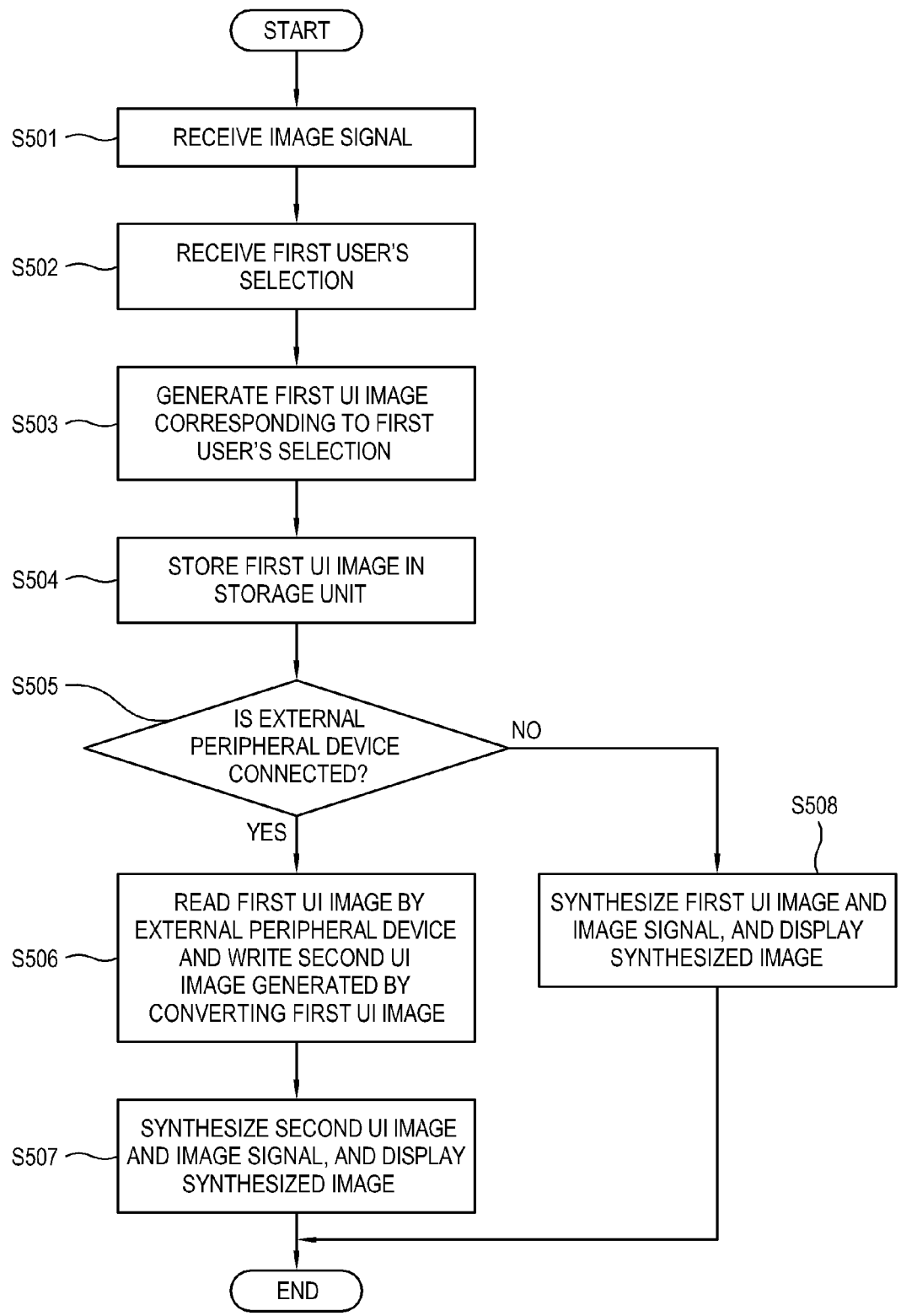
FIG. 8 is a control flowchart of the display system in FIG. 6.

FIG. 8 is a control flowchart of the display system in FIG. 6.

Referring to FIG. 8, the display apparatus 300 receives an image signal from the outside through the first receiver 310 (S501). If the first user's selection is input through the first user input unit 340 (S502), the first controller 380 controls the first UI generator 350 to generate the first UI image which corresponds to the selection of the first user (S503), and stores the generated first UI image in the first storage unit 360 (S504).

The display apparatus 300 identifies whether the external peripheral device 400 is connected to the first peripheral device connector 370 (S505). In response to a determination that the external peripheral device 400 is connected to the first peripheral device connector 370, the external peripheral device 400 accesses the first storage unit 360 of the display apparatus 300, reads the first UI image stored in the first storage unit 360, generates the second UI image by converting the first UI image, and records the second UI image in the first storage unit 360 (S506).

The first signal processor 320 of the display apparatus 300 synthesizes the received image signal and the second UI image, and outputs the synthesized image to the first display unit 330, and the first display unit 330 displays the synthesized image (S507).

In response to a determination that the external peripheral device 400 is not connected to the display apparatus 300 at operation (S505), the signal processor 320 of the display apparatus 300 synthesizes the received image signal and the first UI image, outputs the synthesized image to the first display unit 330, and the first display unit 330 displays the synthesized image thereon (S508).

Figure 9:
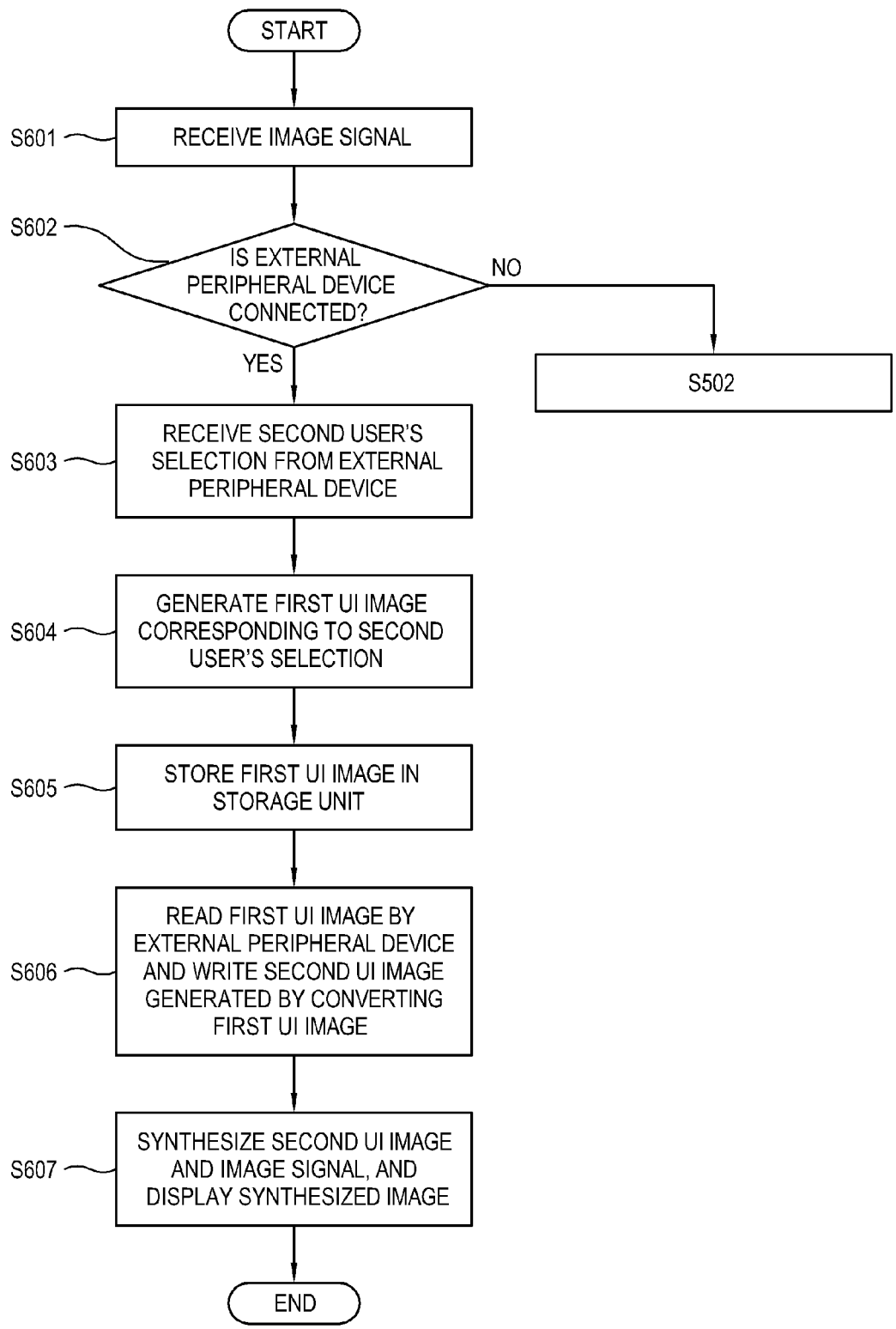
FIG. 9 is a control flowchart of the display system in FIG. 7.

FIG. 9 is a control flowchart of the display system in FIG. 7.

Referring to FIG. 9, the display apparatus 500 receives an image signal from the outside through the second receiver 510 (S601). The display apparatus 500 determines whether the external peripheral device 600 is connected to the second peripheral device connector 560 (S602). In response to a determination that the external peripheral device 600 is connected to the second peripheral device connector 560, the display apparatus 500 receives a selection of a second user from the external peripheral device 600 (S603). In response to the second user's selection being input from the external peripheral device 600, the third controller 570 controls the third UI generator 540 in order to generate the first UI image which corresponds to the selection of the second user (S604), and stores the generated first UI image in the second storage unit 550 (S605).

The external peripheral device 600 accesses the second storage unit 550 of the display apparatus 500, reads the first UI image stored in the second storage unit 550, generates the second UI image by converting the first UI image, and records the second UI image in the second storage unit 550 (S606).

The second signal processor 520 of the display apparatus 500 synthesizes the received image signal and the second UI image, and outputs the synthesized image to the second display unit 530, and the second display unit 530 displays the synthesized image thereon (S607).

In response to a determination that the external peripheral device 600 is not connected to the display apparatus 500 at operation (S602), the operation (S502) and operations (S503), (S504) and (S508) in FIG. 8 are performed instead.

Although a few exemplary embodiments have been shown and described, it will be appreciated by those skilled in the art that changes may be made in these exemplary embodiments without departing from the principles and spirit of the invention, the range of which is defined in the appended claims and their equivalents.

What is claimed is:

1. A display apparatus comprising:
   a display unit;
   a first image processor of the display apparatus configured to perform a first image processing operation on an image signal to output a first image signal to an external peripheral device;
   a peripheral device connector configured to be connected to the external peripheral device having a graphic signal generator which is configured to generate a graphic signal of a graphical user interface (GUI) menu corresponding to a user input; and
   a processor of the display apparatus configured to, in response to a user command being transmitted to the external peripheral device through the peripheral device connector or being input by a user in the external peripheral device:
   (1) receive, from the external peripheral device, a graphic signal of the GUI menu generated by the graphic signal generator of the external peripheral device based on the user command, the user command being a user command for generating the graphic signal of the GUI menu, and
   (2) control the display unit to display an image generated by synthesizing the first image signal and the graphic signal of the GUI menu received from the external peripheral device, the synthesizing being performed by either the display apparatus or the external peripheral device.

2. The display apparatus according to claim 1, further comprising:
   a second image processor of the display apparatus configured to perform a second image processing operation on the first image signal or the graphic signal to output a second image signal,
   wherein the first image processor is further configured to selectively transmit the first image signal to either the external peripheral device or to the second image processor depending on whether a connection exists between the external peripheral device and the peripheral device connector.

3. The display apparatus according to claim 2, wherein the second image processor is configured to perform the second image processing operation comprising a synthesizing operation for overlapping a preset graphic signal onto the first image signal.

4. The display apparatus according to claim 3, further comprising a user input, wherein
the graphic signal comprises image information which corresponds to an input from a user to the user input.

5. The display apparatus according to claim 2, wherein the image signal which is transmitted and received between the display apparatus and the external peripheral device through the peripheral device connector is transmitted and received in frames.

6. The display apparatus according to claim 1, further comprising:
a broadcast signal receiver configured to receive a signal broadcast from an external broadcaster; and
an image signal receiver configured to receive an image signal from an external image source device,
wherein the first image processor is configured to perform the first image processing operation comprising a multiplexing operation for synthesizing, into a picture-in-picture (PIP) image, the broadcasting signal received by the broadcasting signal receiver and the image signal received by the image signal receiver.

7. The display apparatus according to claim 1, further comprising a storage device which stores therein first user interface (UI) image data generated by the graphic signal generator,
wherein the first image processor is further configured to process second UI image data to display the second UI image data on the display unit in response to the data generated by the external peripheral device converting the graphic signal by being stored in the storage device.

8. The display apparatus according to claim 7, wherein the second UI image data is generated by synthesizing the first UI image data generated by the graphic signal generator and the second UI image data generated by the first image processor.

9. The display apparatus according to claim 8, further comprising an image receiver configured to receive an image signal from the outside, wherein
the first image processor is further configured to synthesize the received image signal and the second UI image data, and to output the synthesized image data to the display unit.

10. The display apparatus according to claim 7, further comprising a user input, wherein
the first image processor of the display apparatus is further configured to generate the first UI image data based on one of an input from a user received through the user input and a user's input transmitted by the external peripheral device.

11. An external peripheral device configured to connect to a display apparatus, the external peripheral device comprising:
a display apparatus connector configured to connect to the display apparatus, the display apparatus being configured to perform a first image processing operation on an image signal and to output a first image signal to the external peripheral device;
a graphic signal generator configured to generate a graphic signal of a graphical user interface (GUI) menu corresponding to a user input; and
a processor configured to, in response to a user command for generating the graphic signal of the GUI menu being received from the display apparatus through the display apparatus connector or being input by a user in the external peripheral device, transmit to the display apparatus the graphic signal of the GUI menu so that the display apparatus displays an image generated by synthesizing the first image signal and the graphic signal of the GUI menu received from the external peripheral device according to a second image processing operation, the graphic signal being generated by the graphic signal generator based on the user command, and the synthesizing being performed by either the external peripheral device or the display apparatus.

12. The external peripheral device according to claim 11, wherein the second image processing operation comprises a synthesizing operation for overlapping the graphic signal of the GUI menu to the first image signal transmitted by the display apparatus.

13. The external peripheral device according to claim 12, wherein the graphic signal comprises image information which corresponds to the input of a user to a user input of the display apparatus.

14. The external peripheral device according to claim 11, wherein the image signal, which is configured to be transmitted by the display apparatus to the external peripheral device through the peripheral device connector, is transmitted and received in frames.

15. The external peripheral device according to claim 11, wherein the image processor of the external peripheral device is further configured to generate second user interface (UI) image data by converting first UI image data stored in a storage unit of the display apparatus, and to store the second UI image data in the storage unit.

16. The external peripheral device according to claim 15, wherein the image processor of the external peripheral device is further configured to generate the second UI image data by synthesizing the first UI image data and third UI image data generated by the image processor.

17. A method of controlling a display apparatus, the method comprising:
performing, by the display apparatus, a first image processing operation on an image signal to output a first image signal to an external peripheral device;
in response to a user command being transmitted to the external peripheral device or being input by a user in the external peripheral device:
(1) receiving, by the display apparatus, the graphic signal of the GUI menu from the external peripheral device, the graphic signal being generated by a graphic signal generator of the external peripheral device based on the user command, the user command being a user command for generating a graphic signal of a graphical user interface (GUI) menu; and
(2) displaying, by the display apparatus, an image generated by synthesizing the first image signal and the graphic signal of the GUI menu received from the external peripheral device according to a second image processing operation, the synthesizing being performed by either the display apparatus or the external peripheral device.

18. A method of controlling an external peripheral device which is configured to be connected to a display apparatus, the method comprising:

connecting to the display apparatus, the display apparatus performing a first image processing operation on an image signal and outputting a first image signal to the external peripheral device;

transmitting, in response to a user command for generating a graphic signal of a graphical user interface (GUI) menu being received from the display apparatus or being input by a user in the external peripheral device, the graphic signal of the GUI menu to the display apparatus, the graphic signal being generated by a graphic signal generator of the external peripheral device based on the user command; and displaying an image generated by synthesizing the first image signal and the graphic signal of the GUI menu received from the external peripheral device by the display apparatus according to a second image processing operation, the synthesizing being performed by either the display apparatus or the external peripheral device.

19. A display apparatus and external peripheral device comprising:
- a display unit within the display apparatus;
- a first image processor within the display apparatus, the first image processor being configured to perform a first image processing operation on an image signal to output a first image signal to the external peripheral device;
- a peripheral device connector within the display apparatus connected to the external peripheral device; and
- a graphic signal generator within the external peripheral device configured to generate a graphic signal of a graphical user interface (GUI) menu corresponding to a user input, wherein the external peripheral device is configured to transmit, to the display apparatus, in response to a user command for generating the graphic signal of the GUI menu being received from the display apparatus or being input by a user in the external peripheral device, the graphic signal of the GUI menu generated by the graphic signal generator based on the user command, and wherein the display unit is configured to display an image generated by synthesizing the first image signal and the graphic signal of the GUI menu received from the external peripheral device according to a second image processing operation, the synthesizing being performed by either the display apparatus or the external peripheral device.

20. The display apparatus and external peripheral device of claim 19, further comprising a display apparatus connector within the external peripheral device, the display apparatus connector being connected to the peripheral device connector.

* * * * *